United States Patent
Goodman et al.

(10) Patent No.: US 10,831,164 B2
(45) Date of Patent: Nov. 10, 2020

(54) OPTIMIZED HYDROMODIFICATION MANAGEMENT WITH ACTIVE STORMWATER CONTROLS

(71) Applicant: OptiRTC, Inc., Boston, MA (US)

(72) Inventors: Judd Goodman, El Cerrito, CA (US); Marcus Quigley, Brookline, MA (US)

(73) Assignee: OptiRTC, Inc., Boston, MA (US)

( * ) Notice: Subject to any disclaimer, the term of this patent is extended or adjusted under 35 U.S.C. 154(b) by 336 days.

(21) Appl. No.: 15/713,147

(22) Filed: Sep. 22, 2017

(65) Prior Publication Data
US 2018/0011452 A1 Jan. 11, 2018

Related U.S. Application Data

(63) Continuation of application No. 14/287,934, filed on May 27, 2014, now Pat. No. 9,772,609.
(Continued)

(51) Int. Cl.
*G05B 13/04* (2006.01)
*E03F 5/10* (2006.01)
(Continued)

(52) U.S. Cl.
CPC .............. *G05B 13/04* (2013.01); *E03F 5/107* (2013.01); *G06F 30/20* (2020.01); *E03F 1/002* (2013.01);
(Continued)

(58) Field of Classification Search
CPC .......... G05B 13/04; E03F 5/107; E03F 1/002; G06F 17/5009; G06F 2217/16;
(Continued)

(56) References Cited

U.S. PATENT DOCUMENTS

| | | |
|---|---|---|
| 5,342,144 A | 8/1994 | McCarthy |
| 2002/0139736 A1 | 10/2002 | Stever et al. |
| 2005/0273300 A1 | 12/2005 | Patwardhan et al. |

OTHER PUBLICATIONS

City of Escondido (Jan. 2011) "Hydromodification Management Plan," 300 pgs.

*Primary Examiner* — Carlos R Ortiz Rodriguez
(74) *Attorney, Agent, or Firm* — Lathrop GPM LLP

(57) ABSTRACT

A system, methodology, and programming logic for active stormwater controls to optimize sizing and design of Hydromodification Management (HM) structural Best Management Practices (BMPs) to achieve optimal flow duration control. Control logic enables the controlled release of stormwater from a BMP in a manner most akin to pre-development flow duration curves. Inputs to this logic include: flow duration curves based on continuous hydrologic simulation for pre- and post-development conditions; real-time measurement of water level within the BMP; and real-time measurement of discharge entering the BMP. This control logic can interact with control logic for other stormwater management objectives, such as harvest and reuse, infiltration, and combined sewer overflow prevention, and respective inputs, such as real-time weather forecast data, precipitation gage data, downstream flow gauge data, and water quality data, to meet those design objectives as well. New HM BMPs can be optimized to be smaller and, thus, more feasible to implement. Existing stormwater facilities designed for flood control or other management objectives can be retrofitted to provide hydromodification control as well. When utilized with real-time flow and water level monitoring equipment and data, the flow release logic can be adaptively adjusted without physical retrofit of the BMP's outlet.

10 Claims, 10 Drawing Sheets

Related U.S. Application Data

(60) Provisional application No. 61/827,206, filed on May 24, 2013.

(51) Int. Cl.
*G06F 30/20* (2020.01)
*E03F 1/00* (2006.01)
*G06F 111/10* (2020.01)

(52) U.S. Cl.
CPC ............ *G06F 2111/10* (2020.01); *Y02A 10/33* (2018.01); *Y02A 10/46* (2018.01); *Y02A 20/16* (2018.01); *Y02A 20/408* (2018.01)

(58) Field of Classification Search
CPC ...... Y02A 10/46; Y02A 20/408; Y02A 20/16; Y02A 10/33
See application file for complete search history.

Create flow duration curves for the Pre- and Post-Development (w/out BMP) runoff conditions based on continuous hydrologic simulation — 10
Create Initial Flow Rating curve: Qpre vs. Qpost — 15
Create Revised Flow Rating Curve: Qout = f (Qin, Qcrit) — 20
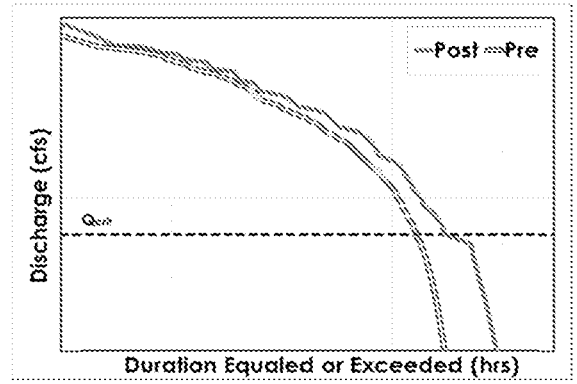
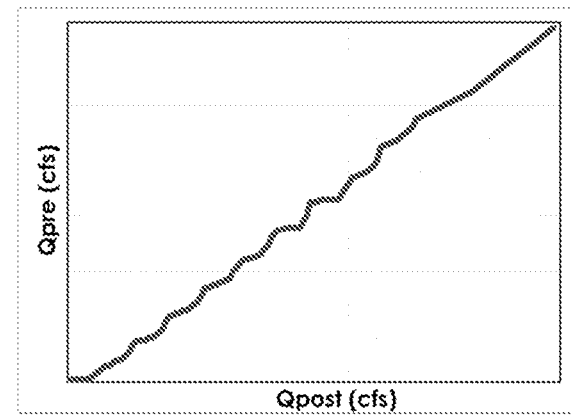
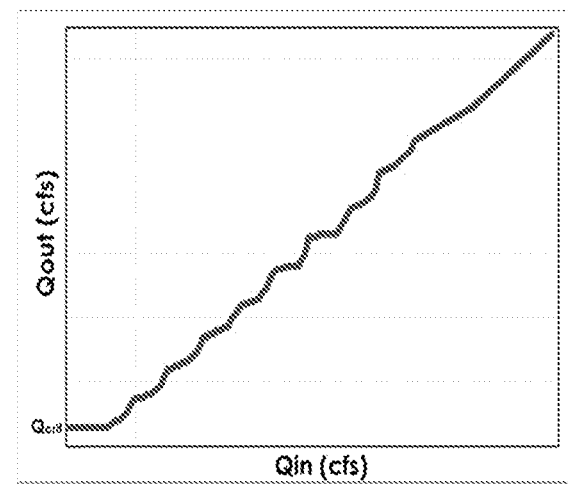
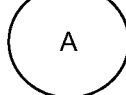
FIG. 1A

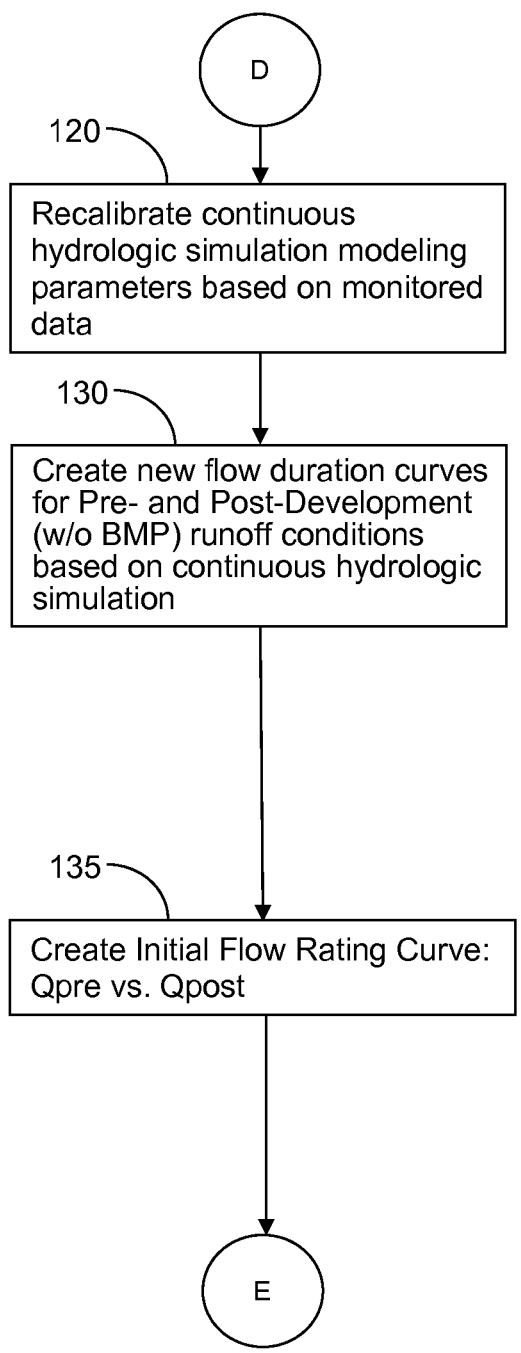
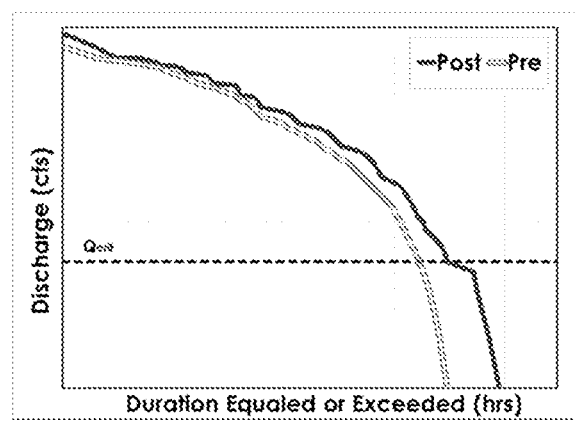
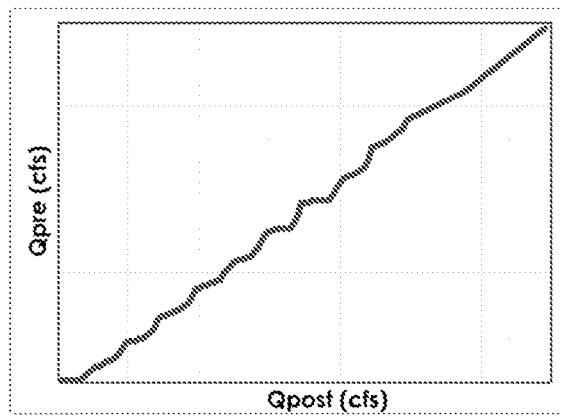
FIG. 1D

| Initial Flow Rating Table | | Revised Flow Rating Table | | Control Curve Look Up Table % open = f($Q_{in}$, stage) | | | | | |
|---|---|---|---|---|---|---|---|---|---|
| Duration Equaled or Exceeded (hrs) | $Q_{post}$ (cfs) | $Q_{pre}$ (cfs) | $Q_{in}$ (cfs) | $Q_{out}$ (cfs) | CURVE 0.25-ft | CURVE 0.50-ft | CURVE 0.75-ft | CURVE 1.00-ft | ... | CURVE 4.00-ft |
| 464579 | 0 | 0 | 0 | 0.054 | 4.2% | 3.0% | 2.4% | 2.1% | ... | 1.1% |
| 8898 | 0.01 | 0.01 | 0.01 | 0.054 | 4.2% | 3.0% | 2.4% | 2.1% | ... | 1.1% |
| 7189 | 0.02 | 0.01 | 0.02 | 0.054 | 4.2% | 3.0% | 2.4% | 2.1% | ... | 1.1% |
| 6183 | 0.03 | 0.01 | 0.03 | 0.054 | 4.2% | 3.0% | 2.4% | 2.1% | ... | 1.1% |
| 5544 | 0.04 | 0.01 | 0.04 | 0.054 | 4.2% | 3.0% | 2.4% | 2.1% | ... | 1.1% |
| 5244 | 0.05 | 0.01 | 0.05 | 0.054 | 4.2% | 3.0% | 2.4% | 2.1% | ... | 1.1% |
| 3017 | 0.06 | 0.01 | 0.06 | 0.054 | 4.2% | 3.0% | 2.4% | 2.1% | ... | 1.1% |
| 2737 | 0.07 | 0.02 | 0.07 | 0.054 | 4.2% | 3.0% | 2.4% | 2.1% | ... | 1.1% |
| 2349 | 0.08 | 0.03 | 0.08 | 0.054 | 4.2% | 3.0% | 2.4% | 2.1% | ... | 1.1% |
| 1937 | 0.09 | 0.04 | 0.09 | 0.054 | 4.2% | 3.0% | 2.4% | 2.1% | ... | 1.1% |
| 1842 | 0.1 | 0.05 | 0.1 | 0.054 | 4.2% | 3.0% | 2.4% | 2.1% | ... | 1.1% |
| 1617 | 0.11 | 0.06 | 0.11 | 0.054 | 4.2% | 3.0% | 2.4% | 2.1% | ... | 1.1% |
| 1528 | 0.12 | 0.06 | 0.12 | 0.06 | 4.7% | 3.3% | 2.7% | 2.3% | ... | 1.2% |
| 1434 | 0.13 | 0.07 | 0.13 | 0.07 | 5.5% | 3.9% | 3.2% | 2.7% | ... | 1.4% |
| 1330 | 0.14 | 0.08 | 0.14 | 0.08 | 6.3% | 4.4% | 3.6% | 3.1% | ... | 1.6% |
| 1261 | 0.15 | 0.08 | 0.15 | 0.08 | 6.3% | 4.4% | 3.6% | 3.1% | ... | 1.6% |
| 1186 | 0.16 | 0.09 | 0.16 | 0.09 | 7.0% | 5.0% | 4.1% | 3.5% | ... | 1.8% |
| 1075 | 0.17 | 0.1 | 0.17 | 0.1 | 7.8% | 5.5% | 4.5% | 3.9% | ... | 2.0% |
| 901 | 0.18 | 0.12 | 0.18 | 0.12 | 9.4% | 6.6% | 5.4% | 4.7% | ... | 2.3% |
| 765 | 0.19 | 0.14 | 0.19 | 0.14 | 10.9% | 7.7% | 6.3% | 5.5% | ... | 2.7% |
| ... | ... | ... | ... | ... | ... | ... | ... | ... | ... | ... |
| 11 | 0.87 | 0.78 | 0.87 | 0.78 | 60.9% | 43.1% | 35.2% | 30.5% | ... | 15.2% |
| 10 | 0.88 | 0.8 | 0.88 | 0.8 | 62.5% | 44.2% | 36.1% | 31.3% | ... | 15.6% |
| 8 | 0.89 | 0.85 | 0.89 | 0.85 | 66.4% | 47.0% | 38.3% | 33.2% | ... | 16.6% |
| 7 | 0.93 | 0.87 | 0.93 | 0.87 | 68.0% | 48.1% | 39.2% | 34.0% | ... | 17.0% |
| 5 | 0.98 | 0.92 | 0.98 | 0.92 | 71.9% | 50.8% | 41.5% | 35.9% | ... | 18.0% |
| 3 | 0.99 | 0.95 | 0.99 | 0.95 | 74.2% | 52.5% | 42.9% | 37.1% | ... | 18.6% |
| 2 | 1.15 | 1.05 | 1.15 | 1.05 | 82.0% | 58.0% | 47.4% | 41.0% | ... | 20.5% |
| 1 | 1.38 | 1.28 | 1.38 | 1.28 | 100.0% | 70.7% | 57.7% | 50.0% | ... | 25.0% |

FIG. 3

RULE 0.25
IF NODE Storage DEPTH >= 0
AND NODE Storage DEPTH <= 0.25
AND NODE Storage INFLOW >= 0
THEN ORIFICE 1 SETTING = CURVE 0.25

RULE 0.50
IF NODE Storage DEPTH > 0.25
AND NODE Storage DEPTH <= 0.50
AND NODE Storage INFLOW >= 0
THEN ORIFICE 1 SETTING = CURVE 0.50

RULE 0.75
IF NODE Storage DEPTH > 0.50
AND NODE Storage DEPTH <= 0.75
AND NODE Storage INFLOW >= 0
THEN ORIFICE 1 SETTING = CURVE 0.75

RULE 1.00
IF NODE Storage DEPTH > 0.75
AND NODE Storage DEPTH <= 1.00
AND NODE Storage INFLOW >= 0
THEN ORIFICE 1 SETTING = CURVE 1.00
…
…
…
…
…

RULE 4.00
IF NODE Storage DEPTH > 3.75
AND NODE Storage DEPTH <= 4.00
AND NODE Storage INFLOW >= 0
THEN ORIFICE 1 SETTING = CURVE 4.00

FIG. 5

OPTIMIZED HYDROMODIFICATION MANAGEMENT WITH ACTIVE STORMWATER CONTROLS

STATEMENT REGARDING FEDERALLY SPONSORED RESEARCH OR DEVELOPMENT

N/A

BACKGROUND OF THE INVENTION

Hydromodification is defined as changes in runoff characteristics and in-stream processes caused by altered land use. With regard to urbanization, when areas are rendered impervious with asphalt, concrete, and roofs, and runoff is conveyed directly to streams via the conventional storm drain system, natural storage in vegetation and infiltration into soil is reduced and overland flow increases. As a result, the magnitude and duration of flow rates entering receiving streams or other channels increases, which contributes to more erosive energy within the channel. Unless managed, hydromodification can cause impacts including channel erosion and results in biological impacts to stream systems as well as infrastructure.

The state of the practice for hydromodification management for new urban development is to mimic long-term pre-development site hydrology. The theory is that if the pre-development distribution of in-stream flows is maintained, then the baseline capacity to transport sediment, a proxy for the geomorphic condition, will be maintained as well. A popular method of mimicking the pre-development flow regime is via flow duration control. This can be done by routing post-development runoff through stormwater detention facilities, also termed structural Best Management Practices (BMPs), such that runoff is stored and slowly released to match pre-development flow rates and durations. Sizing such Hydromodification Management (HM) BMPs relies on continuous hydrologic simulation of both the pre- and post-development conditions and iterative design of the stormwater facility geometry and outlet configuration until flow duration control is achieved. As it turns out, storage requirements for flow duration control tend to be much larger than that for surface water treatment requirements, particularly when the stormwater facilities are small, distributed facilities with simple outlet structures, such as those designed for Low Impact Development (LID). These larger HM BMPs tend to: add cost to construction; be difficult to situate on a project site; and have long drawdown times resulting in vector control concerns.

BRIEF SUMMARY OF THE INVENTION

The invention is a system, methodology and programming logic for active stormwater controls to optimize sizing and design of HM BMPs and to achieve optimal flow duration control. The basic system outlet configuration can consist of (but is not limited to) a modulating valve, orifice, or pump at the bottom of the BMP and an overflow weir at the top of the BMP. Inputs to the control logic include (but are not limited to): flow duration curves based on continuous hydrologic simulation for the pre- and post-development conditions; real-time measurement of water level within the BMP; and real-time measurement of discharge entering the BMP (which can also be measured based on the rate of change of water level and discharge exiting the BMP). If a BMP has stormwater management objectives other than hydromodification management alone (e.g., harvest and reuse, infiltration, first flush capture, flood control, combined sewer overflow prevention, watershed integrated scour control, etc.) then, the methodology can be used in combination with other programming logic controls and their associated inputs (e.g., real-time weather forecast data, precipitation gage data, downstream flow gauge data, downstream sediment transport data, soil moisture data, reuse demand data, water quality data etc.) to meet those design objectives as well.

With the use of active stormwater controls and the methodology described herein, the benefits are three-fold. First, new HM BMPs can be optimized to be smaller and, thus, more feasible to implement. Second, existing stormwater facilities designed for flood control or other management objectives can be retrofitted to provide hydromodification control as well. Third, when utilized with real-time flow and water level monitoring equipment and data, the flow release logic can be adaptively adjusted based on calibrated data without physical retrofit of the BMP's outlet.

BRIEF DESCRIPTION OF THE SEVERAL VIEWS OF THE DRAWINGS

Embodiments of the present invention may be better understood by referring to the following description in conjunction with the accompanying drawings, in which:

FIGS. 1A through 1E collectively provide a flow chart depicting steps of a method for optimizing HM BMP size and design and for achieving active flow duration control according to the present invention;

FIG. 3 is an example flow rating table derived from flow duration curves such as depicted in FIG. 2, the flow rating table being iteratively adapted in the optimization method of FIGS. 1A through 1E and providing parameters for optimized hydromodification management;

FIG. 5 is an example of control logic code that can be employed to implement the optimization and control method of FIG. 1A through 1E.

DETAILED DESCRIPTION OF THE INVENTION

A system and method utilizing active stormwater controls to optimize the sizing and design of Hydromodification Management (HM) Best Management Practices (BMPs) and to achieve flow duration control is disclosed. The system includes programming logic for implementing the method in stormwater control hardware. An efficient and robust solution to the optimization of HM BMPs is thus provided.

Figure 1B:
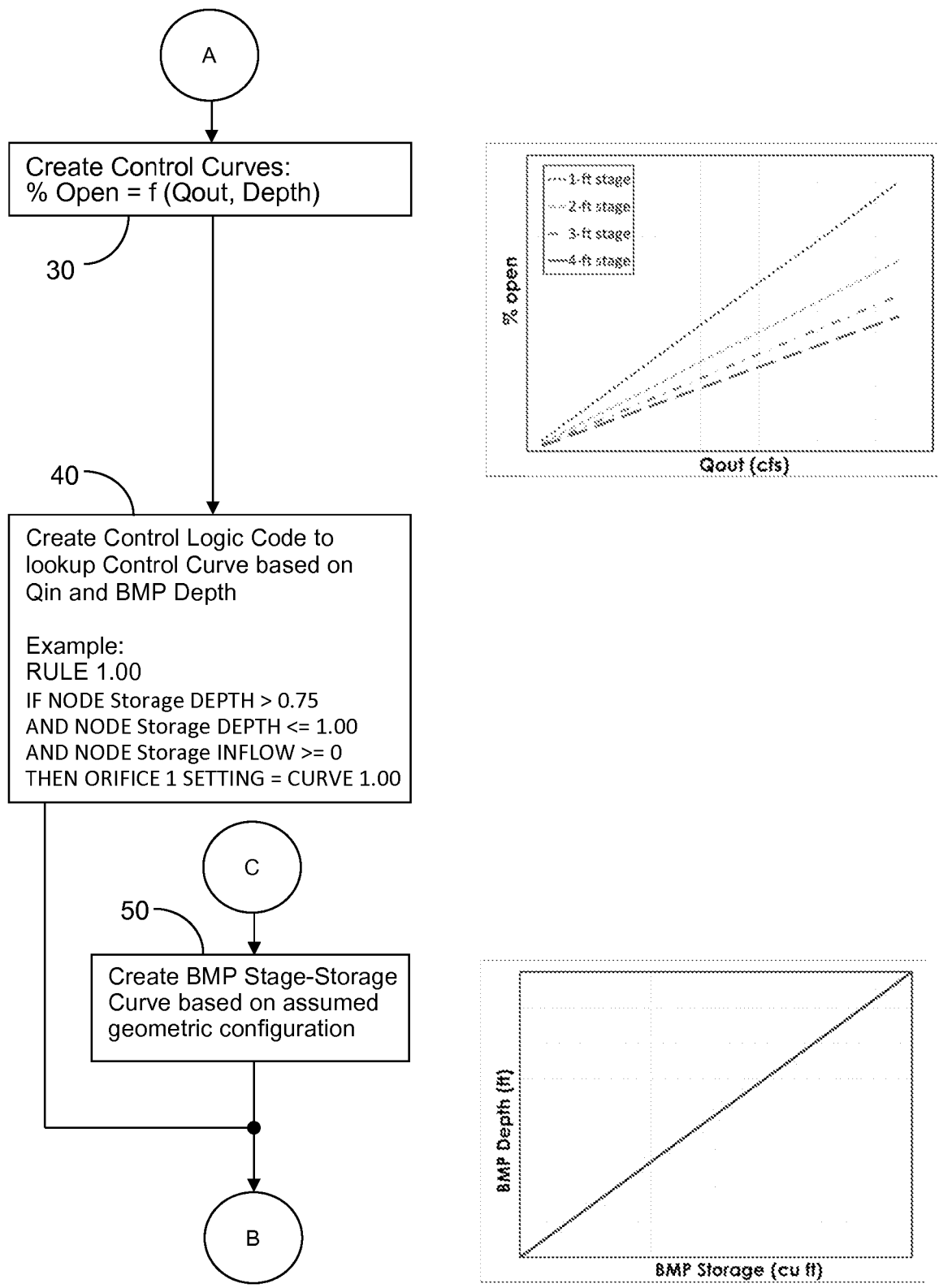
Figure 1C:
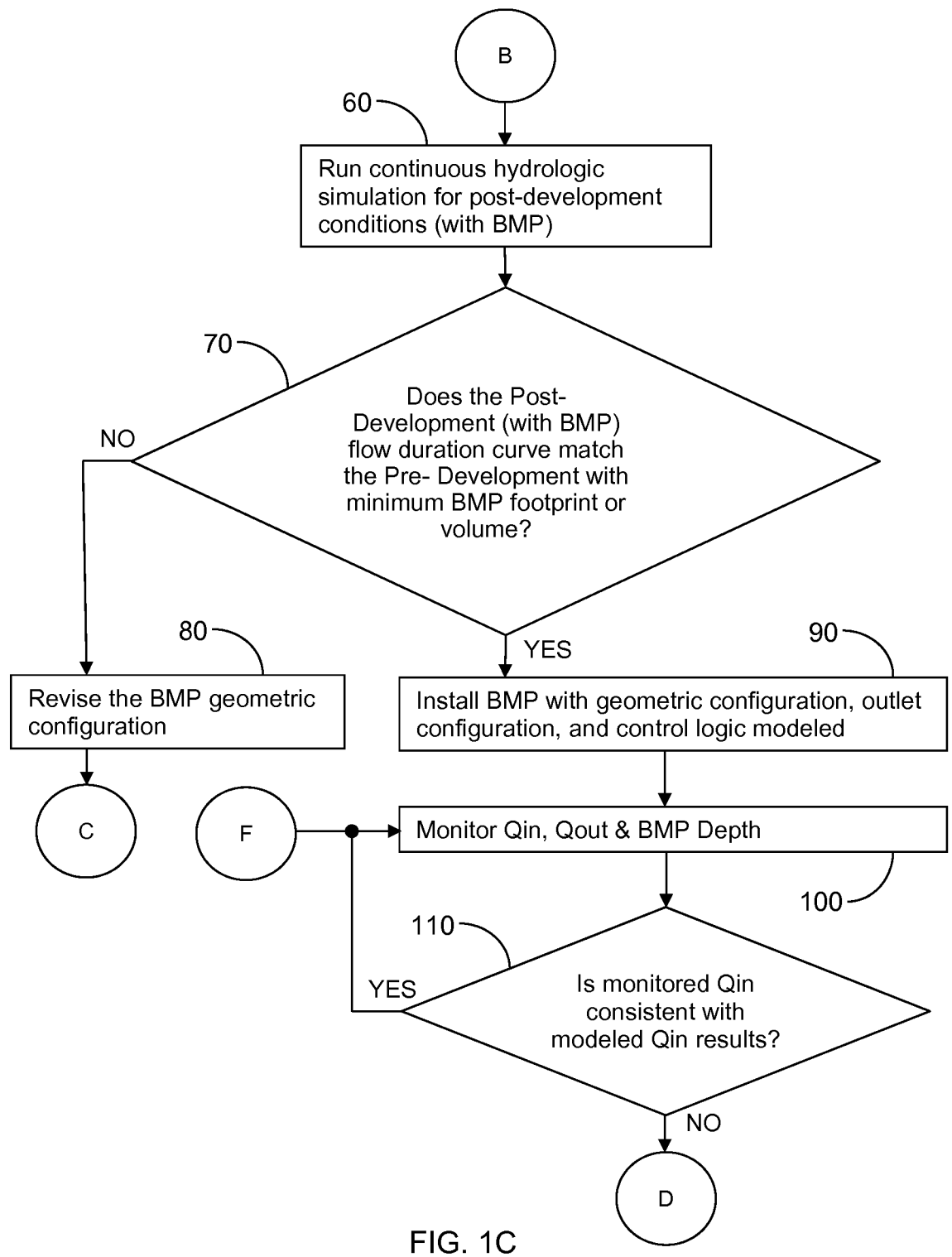
Figure 1E:
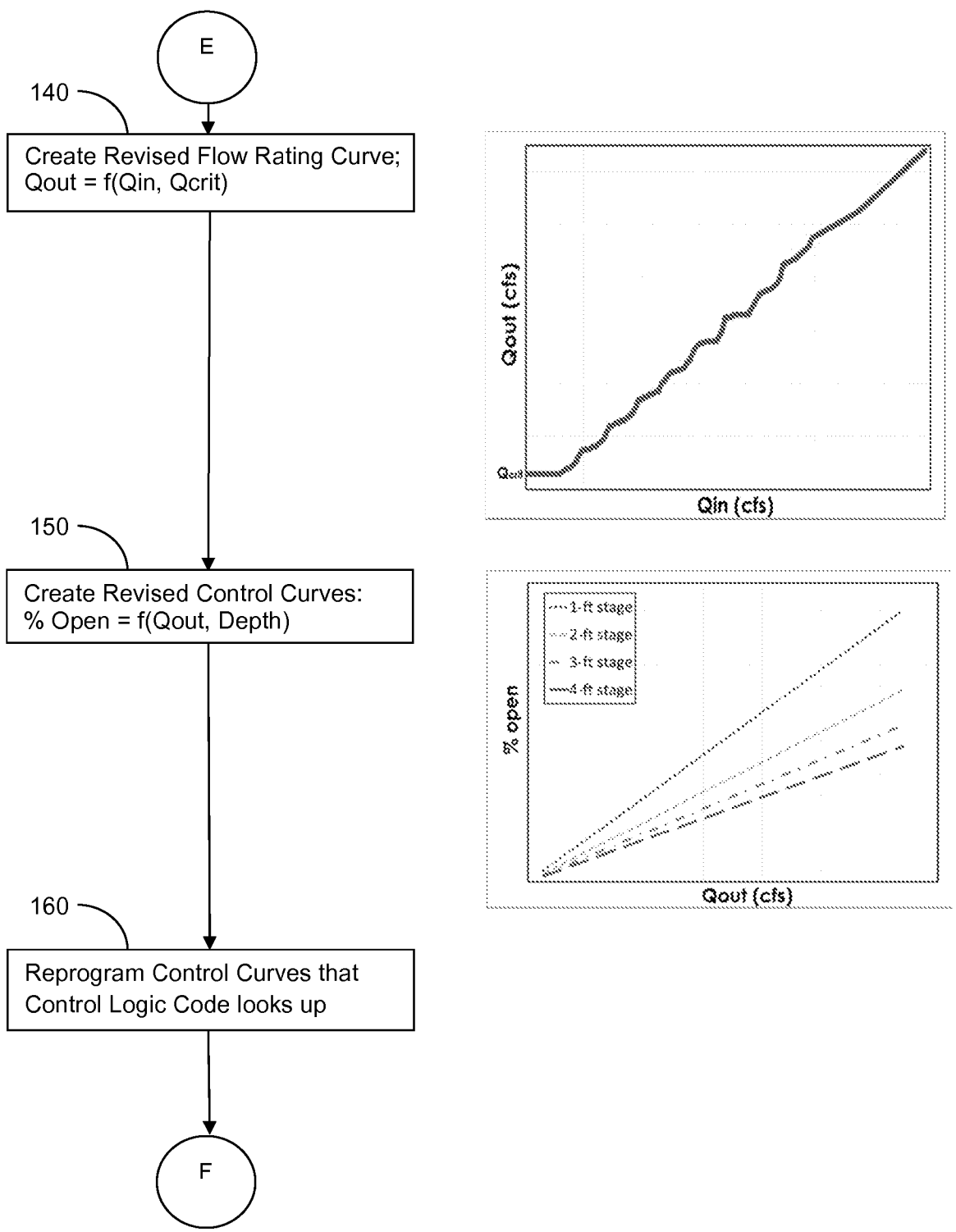

An iterative method for optimizing the sizing and design of HM BMPs and for controlling hydromodification management facilities is described with respect to FIGS. 1A through 1E. A generalized depiction of a stormwater BMP 200 is provided in FIG. 4. In FIG. 1A, the method begins at step 10 by creating a pre- and post-development continuous hydrologic simulation of the drainage management area(s) of interest based upon the input parameters selected in the hydrologic modeling program. A first curve, designated "Pre," depicts a simulation of pre-development flow duration. Post-development flow duration without a BMP is analogized as the post-development flow into a BMP and is referred to as "Post" in the graph accompanying step 10. As is evident, the post-development flow duration is greater that the pre-development flow duration.

Figure 2:
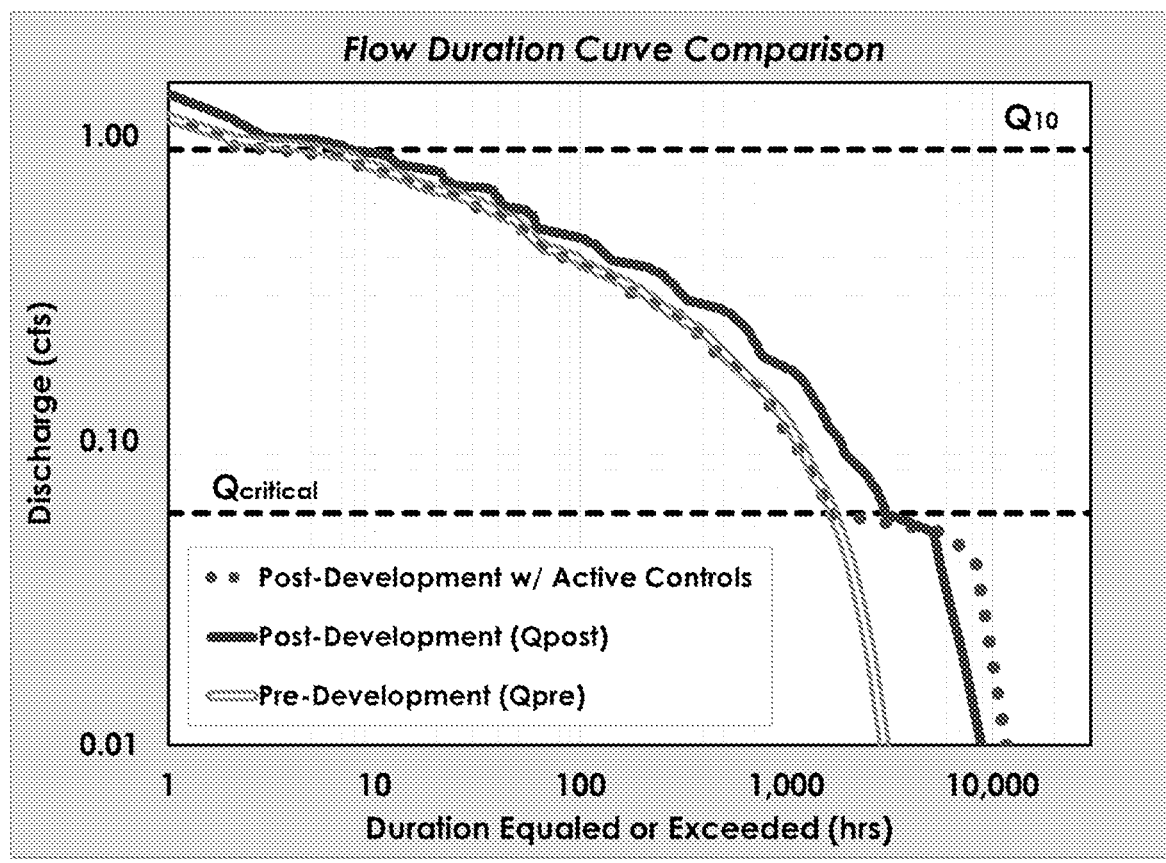
FIG. 2 is a graph providing example flow duration curves associated with the method of FIGS. 1A through 1E.

An enlarged view of the flow duration curves of step 10 are illustrated in FIG. 2. Here, the pre-development flow is identified as $Q_{pre}$ and the post-development flow into the BMP is identified as $Q_{post}$. An additional curve appears in FIG. 2. This is the post-development flow with active controls provided according to the present method, or in other words, the intended flow out of the BMP. With respect to FIG. 4, the post-development flow into the BMP 202 is referred to as $Q_{in}$ while the post-development flow out of the BMP 208 is referred to as $Q_{out}$.

Next, an initial flow rating table is developed based on common flow durations of the two simulated flow records ($Q_{pre}$ vs. $Q_{post}$). An example flow rating table so derived is shown in FIG. 3 and the corresponding flow rating curve is shown at step 15 of FIG. 1A.

The initial flow rating curve and resulting table are then revised to compensate for excess post-development runoff volume, relative to pre-development conditions, that is managed by one or more of: infiltrating stormwater through the bottom 212 of the BMP 200; harvesting runoff for appropriate uses, such as irrigation, toilets, or other gray water uses; and/or discharging stormwater at a critical low flow threshold ($Q_{crit}$) less than the contributing flow rate associated with incipient motion of the receiving stream's bed or bank material. For example, if the excess runoff volume is to be discharged at $Q_{crit}$, then the following logic function can be used: "if $Q_{in}$ is less than $Q_{crit}$, then $Q_{out}$ is equal to $Q_{crit}$." At step 20 of FIG. 1A, an example flow rating curve of $Q_{out}$ versus $Q_{in}$ is depicted. $Q_{out}$ is defined as a function of $Q_{in}$ and $Q_{crit}$. A flow rating table so derived is shown in FIG. 3.

Figure 4:
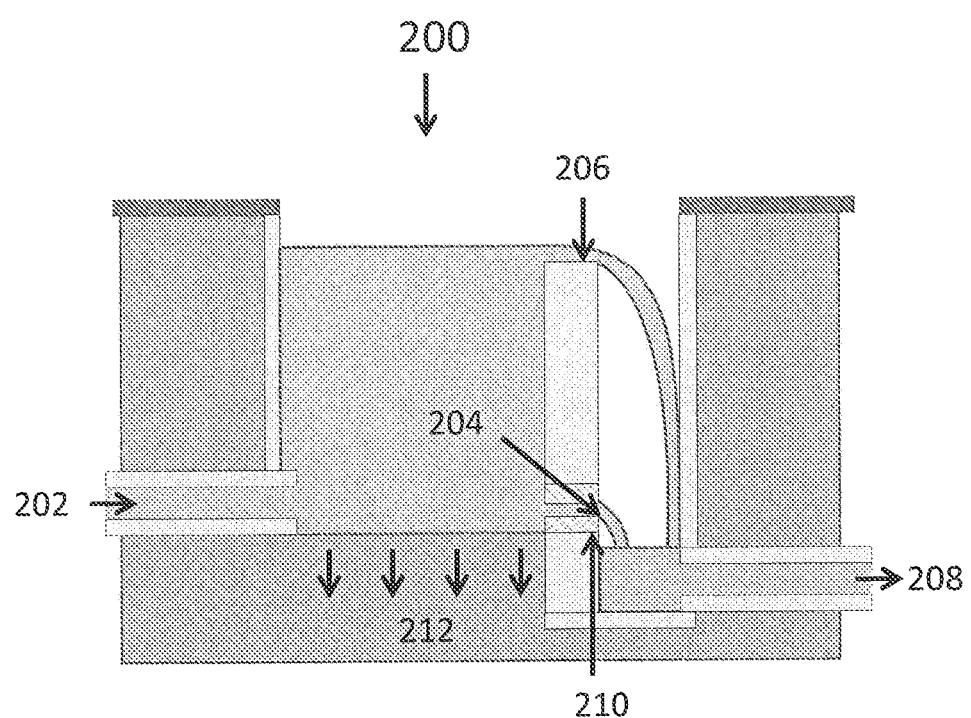
FIG. 4 is a generalized depiction of a structural BMP adapted for use with the optimization and control method of FIGS. 1A through 1E.

The BMP outlet configuration is then modeled. A variety of BMP configurations are employable. One example outlet configuration is depicted in FIG. 4, with a bottom orifice 204 and an overflow weir 206 at a given crest elevation. Note that implementing the presently disclosed method with respect to preexisting stormwater detention facilities will obviously constrain, or eliminate, the ability to choose a BMP configuration. Stages between the bottom hydraulic outlet(s) or orifice(s) 204 and the weir crest 206 elevation based on an increment of water level within the BMP are also defined.

The hydraulic outlet or orifice 204 dimensions are sized so that the outlet can convey the maximum $Q_{pre}$ identified in the simulated flow record at the lowest stage when the outlet 204 is fully open. The overflow weir width is sized such that it can convey the maximum $Q_{post}$, or other design discharge for flood control, at the highest stage in the BMP with sufficient freeboard.

With respect to step 30 of FIG. 1B, for each stage, control curves are created for determining what percentage (%) of a modulating valve 210 disposed within the BMP bottom orifice 204 should be open based upon the flow rating table values for the respective stage. Example control curves are provided in conjunction with step 30 and a control curve look up table is provided in FIG. 3. As shown, the percentage open is a function of $Q_{out}$ and water depth within the BMP.

Using the control curves created in step 30, control logic code is defined at FIG. 1B, step 40 to output the percentage open as a function of $Q_{in}$ and stage. Exemplary control code is illustrated in FIG. 5. The control logic code is intended for use by a modulating valve 210 controller, discussed below.

A BMP stage-storage or stage-area curve is defined based on an assumed geometric configuration, per step 50. An example of such a curve is illustrated in conjunction with step 50.

Based upon this predictive work, a record of a post-development simulated flow through the BMP is then mathematically determined per step 60. The simulated flow duration curves for pre-development and post-development (with BMP) conditions are compared. As per FIG. 1C, step 70, an assessment is made whether, for the flow range of interest, the post-development curve matches the pre-development curve, within some predefined allowable tolerance. The flow range of interest is typically above $Q_{crit}$. If the two flow curves are not sufficiently similar, the BMP geometric configuration is adjusted, as per step 80, and a revised BMP stage-storage curve is created (step 50) and a new hydrologic simulation is performed (step 60) before the pre- and post-development flow duration curves are compared again (step 70).

Through this iterative process, the BMP is sized with as small a footprint as possible. For example, if the post-development flow duration curve is above the pre-development curve by some threshold tolerance, the BMP footprint is increased. Conversely, if the post-development flow duration curve matches the pre-development curve but there is opportunity to achieve a similar match with a smaller BMP footprint, the BMP footprint is decreased. If infiltration of stormwater through the bottom of the BMP is feasible, the resulting BMP footprint will be smaller than if infiltration is not utilized. Note that for retrofits of existing stormwater detention facilities, where it is not feasible or desirable to replace an existing BMP or other facility, the iterative BMP sizing process would not be practiced. An example flow duration curve for post-development conditions with active controls is provided in FIG. 2.

A BMP with the afore-determined geometric configuration, outlet configuration, and control logic is then installed, per step 90.

Following installation, the water level in the BMP, the discharge entering the BMP ($Q_{in}$) and the discharge exiting the BMP ($Q_{out}$) are actively monitored, as per step 100. Sensor options for monitoring water levels include pressure transducers and ultrasonic level sensors. Flowrate can be measured with hydraulic flume structures, if coupled with a water level sensor, or area/velocity sensors. Alternatively, $Q_{in}$ can also be calculated based on the rate of change of the BMP water level, the stage-storage curve of the BMP, and $Q_{out}$ for each time interval. Based upon this data, it is then possible to dynamically recalibrate the continuous hydrologic model parameters, a process known to one skilled in the art, if $Q_{in}$ deviates from the previously modeled $Q_{in}$ results by more than a predefined measure of tolerance, per steps 110 and 120. In other words, if the monitored or measured $Q_{in}$ differs from the previously modeled $Q_{in}$ found in the revised flow rating table, the hydrologic model parameters are recalibrated. New flow duration curves for pre- and post-development (without BMP) runoff conditions, based upon the continuous hydrologic simulation, are calculated, per FIG. 1D, step 130. Likewise, an initial flow rating curve is created, per step 135, a new flow rating curve is calculated, per step 140, and new modulating valve 210 control curves are derived, per step 150.

Based upon the revised control curves of step 150, the control curve look up table, such as illustrated in FIG. 3, is then reprogrammed, as per step 160.

In one embodiment, the analysis of steps 10 through 80 and 110 through 160 is performed by engineering personnel with appropriate software tools and step 90 is performed by the qualified personnel installing the BMP. Step 100 is implemented in a hardware controller, as subsequently discussed. The hardware controller is also responsible for executing control logic code such as shown in FIG. 5.

Monitoring, control, and communication hardware that can be utilized to practice and perform the presently disclosed method include, for example: pressure transducers, ultrasonic level sensors, area/velocity sensors, flow measurement flumes, and fluvial seismometers for determining parameters such as $Q_{in}$, $Q_{out}$, and water depth, area, and volume (collectively referred to as water parameter sensors); solenoid valves, slide gates with linear or other actuators, gate valves, butterfly valves, and pinch valves with motorized or pneumatic actuators (collectively referred to as water flow regulators); and specially programmed microprocessors, custom microcontrollers, or other computing devices with associated memories and communications interfaces including Web gateway units for interfacing to the water parameter sensors, water flow regulators, and remote interfaces and controllers via a communications network such as the Internet.

Figure 6:
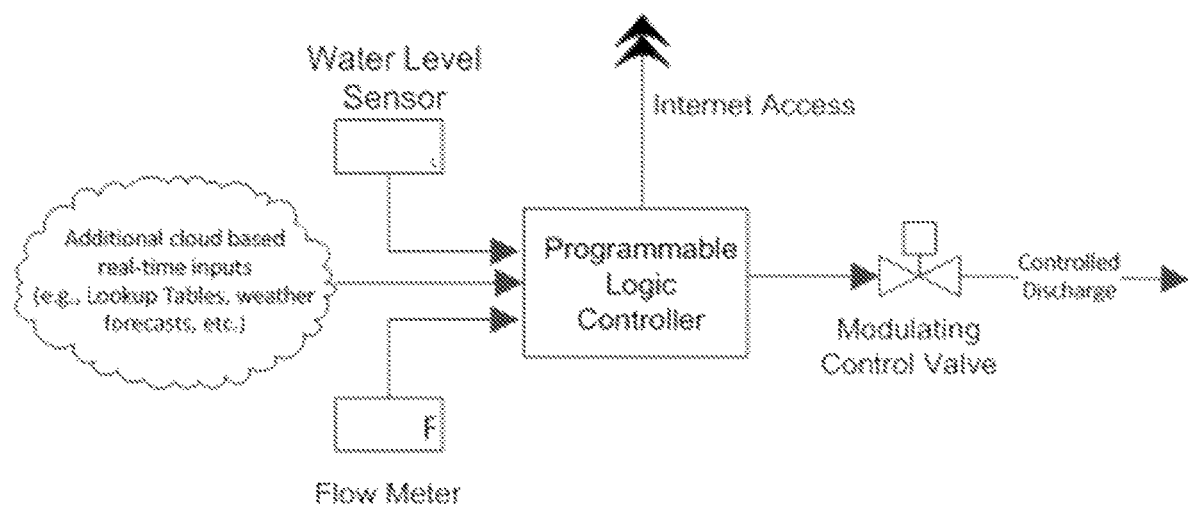
FIG. 6 is a block diagram illustrating one embodiment of hardware resources that are capable of realizing the method of FIGS. 1A through 1E.

With respect to FIG. 6, the heart of a one embodiment of a system capable of implementing the previously disclosed method is a control device such as a Programmable Logic Controller (PLC). This device receives input regarding the state of the BMP, such as an indication of water level from a Water Level Sensor and characteristics of the inflow or outflow. Optional additional inputs include cloud-based real-time inputs such as lookup tables, weather forecasts, etc. For example, the PLC may be programmed to adjust output orifice control in accordance with predicted precipitation forecasts. FIG. 6 also illustrates the control path between the PLC and modulating control valve, thereby producing discharge controlled according to the control logic code, such as illustrated in FIG. 5. Preferably, the PLC is provided with wired or unwired Internet access, thereby enabling the PLC to be reprogrammed with updated control logic code, per step 160 of FIG. 1E. Various other techniques for reprogramming the PLC are also employable, as known to one skilled in the art.

It should be understood that the foregoing embodiments can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared and otherwise manipulated.

Any of the operations depicted and/or described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written to implement all or a portion of the methods disclosed herein, or as noted it may be more convenient to construct a more specialized apparatus to perform the required operations.

The disclosed systems and methods can also be embodied as computer readable code on a computer readable medium. The computer readable medium is any data storage device that can store data, which can be thereafter be read by a computer system. Examples of the computer readable medium include hard drives, read-only memory, random-access memory, CD-ROMs, CD-Rs, CD-RWs, DVDs, magnetic tapes and other optical and non-optical data storage devices. The computer readable medium can also be distributed over a network-coupled computer system so that the computer readable code is stored and executed in a distributed fashion.

The foregoing description has been directed to particular embodiments of this disclosure. It will be apparent, however, that other variations and modifications may be made to the described embodiments, with the attainment of some or all of their advantages. The procedures, processes and/or modules described herein may be implemented in hardware, software, embodied as a computer-readable medium having program instructions, firmware, or a combination thereof. For example, the function described herein may be performed by a processor executing program instructions out of a memory or other storage device. Therefore, it is the object of the appended claims to cover all such variations and modifications as come within the true spirit and scope of the disclosure.

What is claimed is:

1. A method of enabling hydromodification management to compensate for changes in water runoff characteristics resulting from altered land use, the method comprising:

creating parameters of a pre- and post-development continuous hydrologic simulation model of a drainage management area of interest;

defining pre- and post-development flow duration data based upon the hydrologic simulation;

defining desired post-development flow duration data resulting from use of flow control;

creating flow rating data from the defined pre- and post-development flow duration data;

defining the physical parameters of a runoff detention facility having a water outlet with a selectively adjustable opening;

defining a detention facility stage-storage curve based upon the defined physical parameters of the runoff detention facility;

deriving simulated post-development flow duration data through the runoff detention facility based upon the defined physical parameters thereof and the defined stage-storage curve thereof;

comparing the simulated post-development flow duration data with the defined, desired post-development flow duration data and, if the simulated post-development flow duration data differs, within a range of interest by a predefined allowable tolerance, from the desired post-development flow duration data, performing the steps of redefining the physical parameters of the runoff detention facility, redefining the detention facility stage-storage curve based upon redefined physical parameters of the runoff detention facility, rederiving the simulated post-development flow duration data through the redefined physical parameters of the runoff detention facility, and comparing the rederived simulated post-development flow duration data with the defined, desired post-development flow duration data until the difference between the simulated post-development flow duration data and the defined, desired post-development flow duration data, within the range of interest, is within the allowable tolerance.

2. The method of claim 1, wherein the flow rating data comprises a flow rating table and corresponding flow rating curve.

3. The method of claim 1, wherein defining the physical parameters of the detention facility comprises defining the outlet configuration of the detention facility.

4. The method of claim 1, wherein defining the physical parameters of the detention facility comprises defining a number of vertically spaced stages within the detention facility and wherein defining the detention facility stage-storage curve comprises defining a look up table of a control curve per respective stage, each curve defining the detention facility outlet opening according to the respective stage and detention facility in-flow.

5. The method of claim 1, wherein the range of interest of the simulated post-development flow duration data and the defined, desired post-development flow duration data is above a critical low flow threshold.

6. The method of claim 1, further comprising the step of procuring and installing the detention facility as defined once the difference between the simulated post-development flow duration data and the defined, desired post-development flow duration data, within the range of interest, is within the predefined allowable tolerance.

7. A system for enabling hydromodification management to compensate for changes in water runoff characteristics resulting from altered land use, the system comprising:
    a runoff detention facility having a water inlet and a water outlet, the water outlet having a selectively controllable opening and the runoff detention facility having defined physical parameters;
    at least one sensor in communication with the detention facility for sensing one of: water in-flow rate; water out-flow rate; and water volume within the detention facility;
    a controller, executing control logic code, in communication with the water outlet for selectively controlling the water outlet opening in accordance with the control logic code;
    memory associated with the controller for storing the control logic code; and
    a memory interface enabling selective reprogramming of the control logic code within the memory;
    wherein the control logic code is defined according to the steps of
        creating parameters of a pre- and post-development continuous hydrologic simulation model of a drainage management area of interest,
        defining pre- and post-development flow duration data based upon the hydrologic simulation,
        defining desired post-development flow duration data resulting from use of flow control,
        creating flow rating data from the defined pre- and post-development flow duration data,
        defining a stage-storage curve for the detention facility based upon the defined physical parameters of the runoff detention facility;
        deriving simulated post-development flow duration data through the runoff detention facility based upon the defined physical parameters thereof and the defined stage-storage curve thereof;
        comparing the simulated post-development flow duration data with the defined, desired post-development flow duration data and, if the simulated post-development flow duration data differs, within a range of interest by a predefined allowable tolerance, from the desired post-development flow duration data, performing the steps of
            redefining the physical parameters of the runoff detention facility,
            redefining the detention facility stage-storage curve based upon redefined physical parameters of the runoff detention facility,
            rederiving the simulated post-development flow duration data through the redefined physical parameters of the runoff detention facility, and
            comparing the rederived simulated post-development flow duration data with the defined, desired post-development flow duration data until the difference between the simulated post-development flow duration data and the defined, desired post-development flow duration data, within the range of interest, is within the allowable tolerance.

8. The system of claim 7, wherein the flow rating data comprises a flow rating table and corresponding flow rating curve.

9. The system of claim 7, wherein defining the physical parameters of the detention facility comprises defining a number of vertically spaced stages within the detention facility.

10. The system of claim 7, wherein defining the physical parameters of the detention facility comprises defining a number of vertically spaced stages within the detention facility and wherein defining the detention facility stage-storage curve comprises defining a look up table of a control curve per respective stage, each curve defining the detention facility water outlet opening size according to the respective stage and detention facility in-flow.

* * * * *